United States Patent [19]

Tanimura et al.

[11] 4,257,926
[45] Mar. 24, 1981

[54] ADHESION OF RUBBER TO REINFORCING MATERIALS

[75] Inventors: Shozo Tanimura, Minoo; Yasuhisa Saito; Hiroshi Horiuchi, both of Toyonaka; Kazunori Mieno, Nishinomiya; Shinji Nakao, Sakai; Takaaki Nakano, Takarazuka; Kenzo Kamei, Sakai, all of Japan

[73] Assignee: Sumitomo Chemical Company, Limited, Osaka, Japan

[21] Appl. No.: 872,020

[22] Filed: Jan. 24, 1978

[30] Foreign Application Priority Data

Jan. 24, 1977 [JP] Japan .................................. 52/6978
Jan. 26, 1977 [JP] Japan .................................. 52/8024
Jan. 31, 1977 [JP] Japan .................................. 52/10107

[51] Int. Cl.³ ........................... C08L 7/00; C08L 9/00; C08L 11/00; C08L 61/04
[52] U.S. Cl. ......................... 260/3; 260/42.32; 260/42.47; 525/135; 525/139; 525/140
[58] Field of Search ............... 260/3, 845, 846, 42.32, 260/42.47; 526/71; 525/135, 139, 140; 156/335

[56] References Cited

U.S. PATENT DOCUMENTS

| | | | |
|---|---|---|---|
| 3,485,797 | 12/1969 | Robins | 526/71 |
| 3,763,104 | 10/1973 | Buchanan | 526/71 |
| 3,817,890 | 6/1974 | Rouzier | 260/29.3 |
| 3,829,528 | 8/1974 | Aarna et al. | 260/51.5 |
| 3,843,484 | 10/1974 | Kamiyoshi et al. | 156/335 |
| 3,888,813 | 6/1975 | Moult et al. | 260/845 |
| 3,963,652 | 6/1976 | Tanimura et al. | |
| 3,992,334 | 11/1976 | Harvey | 260/3 |
| 4,014,827 | 3/1977 | Hart et al. | 260/846 |
| 4,025,454 | 5/1977 | Rouzier | 260/29.3 |

*Primary Examiner*—Allan Lieberman
*Attorney, Agent, or Firm*—Birch, Stewart, Kolasch & Birch

[57] ABSTRACT

A method is disclosed for adhering rubber and reinforcing materials simultaneously with vulcanization, without defects such as fume and bloom phenomena of formaldehyde-acceptors, deliquescence and blocking, which is characterized in the use of a vulcanizable rubber composition containing an improved co-polycondensate resin which is prepared by condensing (A) a resol type pre-polycondensate prepared by at least one phenol and formaldehyde or acetaldehyde in the presence of an alkaline catalyst, and (B) resorcinol, m-aminophenol or the like, while distilling off water present in the reaction system, and then solidifying the reaction mixture.

3 Claims, No Drawings 4,257,926

ADHESION OF RUBBER TO REINFORCING MATERIALS

BACKGROUND AND SUMMARY OF THE INVENTION

The present invention relates to an improvement in the adhesion between rubber and reinforcing materials simultaneously with vulcanization.

In the preparation of rubber articles such as tires, belts and hoses whose rubber is required to be reinforced with reinforcing materials, the adhesion between the rubber and the reinforcing materials often becomes a problem.

Adhesion has conventionally been carried out by pretreating reinforcing materials with certain adhesives. In recent years, however, with increase of requirement for the more strongly adhered articles having higher quality, the so-called "compounding adhesion" has attracted the attention of the industry. Thus, certain chemicals are incorporated into rubber on compounding of various ingredients, thereby performing the adhesion between the reinforcing materials and rubber during the vulcanization irrespective of whether the reinforcing materials are pretreated with adhesives or not.

The compounding adhesion includes the following two methods. One of them comprises adhering the rubber to the reinforcing materials during the vulcanization thereof by compounding (1) a formaldehyde-acceptor such as m-disubstituted benzenes (e.g. resorcinol, m-aminophenol, a reaction product of resorcinol and formaldehyde (i.e. resorcinol resin), etc.) and (2) a formaldehyde-donor which is capable of generating formaldehyde by heating into the rubber. Another method comprises adhering the rubber to a steel cord with vulcanization of the rubber wherein a halogen-acceptor such as m-disubstituted benzene (e.g. resorcinol, m-aminophenol or resorcinol resin) and a halogen-donor such as tetrachloro-p-benzoquinone, N,N-dihalogenated aromatic sulfonamides or cylic N-halogenated amides are compounded into the rubber. However, these methods have the following various important defects, and hence development of an improved method has been requested.

That is, when m-disubstituted benzenes such as resorcinol or m-aminophenol are used in the compounding adhesion, these acceptors fume during the compounding at a high temperature (usually above 110° C.) which is essential for uniform dispersion of the acceptor into rubber, which results in a bad effect on environmental sanitation. Moreover, when the rubber compounded with the acceptor is allowed to stand, a bloom phenomenon of the acceptors such as resorcinol or m-aminophenol unfavorably appears. When the bloom of resorcinol or m-aminophenol appears, the adhesion between the rubber and the reinforcing materials becomes uneven, which results in a remarkable decrease in quality of the rubber articles.

For the purpose of solving these problems, there has been proposed the use of the so-called resorcinol resin which is prepared by the condensation of resorcinol and formaldehyde, as an acceptor instead of resorcinol or m-aminophenol. This resorcinol resin comprises mainly dimer, trimer or tetramer which are different from a monomer such as resorcinol or m-aminophenol, and hence, the defects of these monomers such as fume thereof or bloom phenomenon are fairly improved, but other defects are newly induced owing to resinification.

That is, the resorcinol resin has strong moisture absorption properties and is readily solidified, by which the preservability and workability for compounding and weighing are significantly decreased and further moisture which is detestable for compounding rubber is unfavorably contained in the rubber. It has been requested to eliminate these defects by the manufacturer, transporter and user of resorcinol resin.

The present inventors have previously found that these detects could be mostly eliminated by using a copolycondensate of alkylphenol-formaldehyde-resorcinol (cf. U.S. Pat. No. 3,963,652). As the result of a further extensive study, it has now been found that improved adhesion between the rubber and the reinforcing materials can be achieved by using a co-polycondensate which is prepared by an entirely different method than that disclosed in said U.S. Pat. No. 3,963,652.

The co-polycondensate of alkylphenol-formaldehyde-resorcinol used in the U.S. Pat. No. 3,963,652 is prepared by reacting resorcinol with a pre-polycondensate of alkylphenol and formaldehyde, and after completion of the reaction, distilling off water which is present in the reaction system, as is disclosed in Example 1 of the patent. It has now unexpectedly been found that when the reaction of the prepolycondensate and resorcinol is carried out while distilling off water and subsequently solidifying the reaction product, the co-polycondensate thus produced has more excellent properties than those of the co-polycondensate of the above U.S. patent, that the favorable co-polycondensate having excellent properties can be produced by this process using not only the pre-polycondensate of alkylphenol and formaldehyde as disclosed in the above U.S. patent but also any pre-polycondensate prepared from other phenols than the alkylphenols disclosed in the U.S. patent and acetaldehyde in place of formaldehyde, and further that when the proportion of resorcinal to alkylphenol in the co-polycondensate is smaller, the co-polycondensate of the above U.S. patent is improved in deliquescence and blocking but has unfavorably a decreased adhesion effect as is disclosed in the U.S. patent, but on the contrary, the co-polycondensate produced by the specified process of the present invention has an excellent adhesion effect without undesirable deliquescence and blocking, even though the proportion of resorcinol is small, and moreover, when the proportion of resorcinol is large, the co-polycondensate in the present invention has not only an excellent adhesion effect but also more significantly improved deliquescence and blocking than those of the co-polycondensate of the above U.S. patent.

Although is is not clear why the difference in the processes of the present invention and of the U.S. patent causes the difference in the properties of the produced co-polycondensate resins, it is assumed as follows.

When the resol type pre-polycondensate is reacted with resorcinol or m-aminophenol while distilling off water present in the reaction system as in the present invention, the obtained co-polycondensate resin has a structure such that resorcinol or m-aminophenol will selectively bond to both ends of the pre-polycondensate. On the other hand, when the resol type pre-polycondensate is reacted with resorcinol in the pressure of water as is disclosed in the above U.S. patent, the obtained co-polycondensate resin has a structure such that resorcinol or m-aminophenol will not bond to both ends of the pre-polycondensate but will bond only to one end thereof or to the middle part thereof. This structural difference will result in the difference in the properties of the products.

An object of the present invention is to provide an improvement in the adhesion between rubber and reinforcing materials by using a co-polycondensate having excellent properties.

Another object of the present invention is to provide an improved co-polycondensate of a phenol and formaldehyde or acetaldehyde which is useful for the adhesion between rubber and reinforcing materials simultaneously with vulcanization.

A further object of the present invention is to provide a process of the production of the improved co-polycondensate.

These and other objects of the present invention will be apparent from the following description.

That is, the present invention provides a vulcanizable rubber composition comprising (I) a rubber component, (II) a compound which is capable of generating formaldehyde by heating, or at least one of the compounds selected from the group consisting of (i) a p-benzoquinone derivative, (ii) an N,N-dihalogenated aromatic sulfonamide derivative, wherein the nitrogen atom of the sulfonamide group is bonded with two halogen atoms selected from chlorine, bromine and iodine and the sulfur atom of the sulfonamide group is directly bonded to the aromatic nucleus, and (iii) a cyclic N-halogenated amide wherein the carbon atom of the carbonyl group in the cycle is bonded to two nitrogen atoms and said nitrogen atoms are bonded with a halogen atom to form the group of the formula:

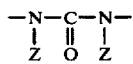

wherein Z is chlorine, bromine or iodine atom, and (III) a co-polycondensate resin prepared by condensing (A) a resol type pre-polycondensate prepared by reacting at least one of monovalent phenols of the formula (a):

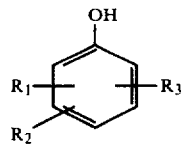

wherein $R_1$, $R_2$ and $R_3$ are the same or different and are each hydrogen, an alkyl having 1 to 12 carbon atoms, an aryl having 6 to 12 carbon atoms or an aralkyl having 7 to 12 carbon atoms, and formaldehyde or acetaldehyde in the presence of an alkaline catalyst, and (B) at least one of the compounds of the formula (b):

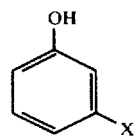

wherein X is -OH, $-NH_2$, $-O-CO-R_4$ or $-O-R_5$, and $R_4$ and $R_5$ are each an alkyl having 1 to 4 carbon atoms, said compounds of the formula (a) and the formula (b) being used in a molar ration of 0.75/0.25 to 0.25/0.75 [the compound of the formula (a)/the compound of the formula (b) ], while distilling off water present in the reaction system, and then solidifying the reaction mixture, and also provides a method for the adhesion between rubber and reinforcing materials comprising applying a vulcanizable rubber composition containing a natural or synthetic rubber as the main component to a reinforcing material which is pre-treated or not and then vulcanizing the rubber composition, which is characterized in the use of the above-mentioned vulcanizable rubber composition.

The present invention provides also an improved process for producing a solid co-polycondensate resin, which comprises condensing (A) a resol type pre-polycondensate prepared by reacting at least one of the phenols of the above formula (a) and formaldehyde or acetaldehyde in the presence of an alkaline catalyst, and (B) at least one of the compounds of the above formula (b), while distilling off water present in the reaction system, said compounds of the formula (a) and the formula (b) being used in a molar ratio of 0.75/0.25 to 0.25/0.75 [the compound of the formula (a)/the compound of the formula (b) ], and then solidifying the reaction mixture.

In a preferred embodiment of the present invention, the co-polycondensate resin is produced by reacting at least one of the phenols of the formula (a) as disclosed above with formaldehyde in an amount of 0.5 to 2.5 equivalents per one equivalent of the phenols in the presence of an alkaline catalyst to give a resol type pre-polycondensate which contains substantially no unreacted formaldehyde, and then condensing the pre-polycondensate thus obtained with resorcinol or m-aminophenol in an amount of 0.43 to 2.3 equivalents per one equivalent of the phenols and of 0.7 to 1.5 equivalent per one equivalent of methylol group included in the pre-polycondensate, while distilling off water present in the reaction system, One of the characteristics of the process for the production of the solid co-polycondensate resin of the present invention is that the co-polycondensation reaction of the resol type pre-polycondensate derived from a monovalent phenol and resorcinol is carried out while distilling off water, which is generated during the reaction and also is present before the initiation of the reaction, from the reaction system.

Since the co-polycondensation reaction of the pre-polycondensate and resorcinol is a dehydration reaction, the polycondensation reaction is promoted by distilling off water from the reaction system. Accordingly, in case of using no solvent, when water is distilled no more, the reaction is completed and the desired resin is obtained. On the other hand, in case of using a solvent, when water is no more distilled, the solvent is distilled off to give the desired resin. Thus, when the process of the present invention is carried out by using a solvent, the solvent is distilled off after completion of the co-polycondensation reaction, and hence, the solvent can easily be removed without proceeding to further reaction as is occasionally observed in the known process as disclosed in the above U.S. patent.

That is, according to the process of the above U.S. patent, polycondensation reaction of the prepolycondensate and resorcinol is carried out in the presence of water, and hence, the reaction may partially proceed, but it may be difficult to complete the reaction. Accordingly, when the solvent is distilled off after the reaction, the reaction will further proceed during the distillation of solvent, which results in increase of the molecular weight of the resin, and whereby the mixture will rapidly become highly viscous, is stirred with difficulty or is gelled to produce an insoluble resin.

On the other hand, according to the process of the present invention, the reaction is carried out while distilling off water being present in the reaction system, and hence, the desired resin can stably be produced without rapid increase of viscosity or gelation during the concentration of the reaction mixture.

Another characteristic of the present invention is that the amount of resorcinol is specified to the range of 0.7 to 1.5 equivalent, preferably 0.8 to 1.3 equivalent, per one equivalent of methylol group included in the pre-polycondensate.

By using resorcinol in such a specified amount, the resin thus obtained has excellent properties and is useful, particularly as rubber-compounded adhesives, adhesives for woods or metals, binding agents for shell molding, or the like.

When resorcinol is used in a larger amount than the above range, the content of unreacted monomers in the resin is increased, and hence, the resin shows the same defects as those in case of the conventional resorcinol resins as mentioned above. On the other hand, when resorcinol is used in a smaller amount, the resulting resin shows significantly lower adhesion properties.

A further characteristic of the present invention is that the amount of resorcinol is limited to the range of 0.43 to 2.3 equivalents, preferably 0.5 to 2 equivalents, per one equivalent of the phenols.

As is disclosed in the above U.S. patent, when resorcinol is used in an amount smaller than that of the phenols, it will generally be expected that the resin does not show a sufficient adhesion effect. Nevertheless, it has now surprisingly been found that according to the process of the present invention, the desired co-polycondensate resin can stably be produced and has sufficient adhesion effects even though resorcinol is used in a smaller amount.

By the way, if resorcinol is used in an amount which is too much larger than the above range, the resin thus obtained has still a certain adhesion effect, but shows undesirable defects, such as high deliquescence and blocking, and hence, the resin is not favorable in view of inferior preservability and difficult handling.

The resol type pre-polycondensate of the phenols of the formula (a) can be prepared in a usual manner. For instance, the resol type pre-polycondensate can be prepared by reacting one equivalent of the phenols with 0.5 to 2.5 equivalents of formaldehyde or acetaldehyde at a temperature of 40° to 150° C. in the presence of an alkaline catalyst, such as a hydroxide or carbonate of an alkali metal or alkaline earth metal (e.g. sodium hydroxide, potassium hydroxide, lithium hydroxide, magnesium hydroxide, calcium hydroxide, sodium carbonate, potassium carbonate, lithium carbonate, magnesium carbonate, calcium carbonate, etc.).

The resol type pre-polycondensate thus prepared is reacted with the compound of the formula (b) (e.g. resorcinol or m-aminophenol) in the specified amount while distilling off water present in the reaction system. The reaction can proceed in the presence or absence of a solvent, but it is preferable to use an appropriate organic solvent in order to ensure the smooth progress of the reaction. The most suitable organic solvent is azeotropic with water and a mixture thereof with water can easily be separated into the aqueous layer and the solvent layer by cooling the mixture. Suitable examples of the organic solvent are benzene, toluene, xylene, cumene, ethylbenzene, n-propylbenzene, isopropylbenzene, n-butylbenzene, isobutylbenzene, sec-butylbenzene, tert-butylbenzene, cymene, mesitylene, or the like.

Besides, even if the mixture of the solvent with water can not completely be separated, if the mixture can be separated into a layer comprising predominantly water and a layer comprising predominantly the organic solvent, such azeotropic organic solvents can also be used. Examples of such organic solvents are n-butyl alcohol, isobutyl alcohol, sec-butyl alcohol, n-pentyl alcohol, isopentyl alcohol, tert-pentyl alcohol, n-hexyl alcohol, n-octyl alcohol, benzyl alcohol, methyl ethyl ketone, methyl isopropyl ketone, methyl isobutyl ketone, 2-pentanone, 3-pentanone, 2-hexanone, 3-hexanone, n-propyl ether n-butyl ether, or the like.

Moreover, a solvent which is soluble in water but is azeotropic with water can also be used, because the polycondensation reaction may be carried out while distilling off both the solvent and water by azeotropic distillation and simultaneously adding the solvent to the reaction system. Examples of such solvents are methyl alcohol, ethyl alcohol, n-propyl alcohol, isopropyl alcohol, acetone, tetrahydrofuran, or the like.

The polycondensation reaction of the resol type pre-polycondensate and the compound of the formula (b) may be carried out in the absence of a catalyst, but conventional acid catalysts, such as hydrochloric acid, sulfuric acid, nitric acid, formic acid, oxalic acid, acetic acid, p-toluenesulfonic acid, or the like may be used. The reaction temperature may preferably be in the range of 40° to 200° C.

When the softening point of the resin is too low, it has a problem of blocking during the preservation thereof, and on the other hand, when the softening point of the resin is too high, the resin can hardly be molten by heating. The co-polycondensate resin obtained by the process of the present invention has a softening point of 70° to 140° C., which is favorable from the viewpoints mentioned above.

The monovalent phenols of the formula (a) used as the starting material for the co-polycondensate resin include phenol and phenols having one or more substituents selected from the group consisting of an alkyl having 1 to 12 carbon atoms, an aryl having 6 to 12 carbon atoms and an aralkyl having 7 to 12 carbon atoms, such as o-cresol, m-cresol, p-cresol, 2,3-xylenol, 2,5-xylenol, 3,4-xylenol, 3,5-xylenol, p-tert-butylphenol, p-tert-octylphenol, p-n-nonylphenol, p-phenylphenol, p-benzyl-phenol, p-isopropylphenol, 3-methyl-5-isopropylphenol, p-(α-methylbenzyl)phenol, 3-methyl-6-tert-butylphenol, p-β-phenylethylphenol, or the like.

Besides, formaldehyde and acetaldehyde to be reacted with the phenols include paraform (i.e. paraformaldehyde).

The compound of the formula (b) includes resorcinol, m-aminophenol, resorcinol monoacetate, resorcinol monopropionate, resorcinol monobutyrate, resorcinol monomethyl ether, resorcinol monoethyl ether, resorcinol monopropyl ether, resorcinol monobutyl ether, or the like.

With respect to the molar ratio of the compound of the formula (a) to the compound of the formula (b) in the above reaction, when the compound of the formula (a) is used in an amount of less than 25% by mol, the resulting co-polycondensate resin has a satisfactory adhesion effect but has some defects such as fume of the monomers or bloom phenomenon, because unreacted compound of the formula (b) remains in the resin. On the other hand, when the compound of the formula (a) is used in an amount of more than 75% by mol, the resulting co-polycondensate resin does not show blocking owing to moisture absorption but shows unfavorably lower adhesion effect. Thus, the compounds of the formula (a) and the formula (b) are used in a molar ratio of 0.75/0.25 to 0.25/0.75 [the compound of the formula (a)/the compound of the formula (b)].

The co-polycondensate resin of the present invention is used in the compounding adhesion, and it is usually added in an amount of 0.5 to 10 parts by weight per 100 parts by weight of rubber (the unit of the amount is, hereinafter, referred to as "PHR"), preferably 1 to 5 PHR. Other conditions as used in the conventional compounding adhesion are applied to the compounding adhesion using the present co-polycondensate resin.

The compound (II) which is capable of generating formaldehyde by heating during the vulcanization includes various compounds disclosed in the specification of U.S. Pat. No. 3,751,331. Among those, suitable examples are hexamethylenetetramine, di- to hexa-methylolmelamines or completely or partially etherified or esterified derivatives thereof, oxazolidine derivatives, polyvalent methylolacethylene urea, N-methyl-1,3,5-dioxazine, or the like. They are usually added in an amount of 0.3 to 10 PHR, preferably 0.5 to 5 PHR.

The group of compounds (II) used as another second component, i.e. the p-benzoquinone derivative (II-i), the N,N-dihalogenated aromatic sulfonamide derivative (II-ii) and the cyclic N-halogenated amide (II-iii), include the compounds as described in the specification of Japanese Patent Laid Open Publication (unexamined) Nos. 34679/1974 and 99579/1974. Typical examples thereof are tetrachloro-p-benzoquinone (II-i) (hereinafter, referred to as Compound A), N,N,N',N'-tetrachlorooxybis(benzenesulfonamide) (II-ii) (hereinafter, referred to as Compound B), naphthalene 1,5-di(N,N-dichlorosulfonamide) (II-ii) (hereinafter, referred to as Compound C) and trichloroisocyanulic acid (II-iii) (hereinafter, referred to as Compound D).

The rubber used as the rubber component (I) in the present vulcanizable rubber composition includes various natural and synthetic rubbers, for example, styrenebutadiene copolymer rubber, polyisoprene rubber, polybutadiene rubber, acrylonitrile-butadiene rubber, polychloroprene rubber, or the like.

The reinforcing materials used in the present invention include organic reinforcing materials, such as cotton, nylon, polyester, rayon, or the like, and inorganic reinforcing materials, such as brassted steel cord, galvanized steel cord, glass cord, or the like.

When the compounds (II) such as the p-benzo-quinone derivative (II-i), the N,N-dihalogenated aromatic sulfonamide derivative (II-ii) and the cyclic N-halogenated amide (II-iii) are used as the second component, the vulcanizable rubber composition is preferably used for the adhesion between rubber and a steel cord.

The vulcanizable rubber composition may be incorporated with other various additives, such as carbon black. Besides, silicic acid, silicic anhydride, and further cobalt salt or organic acids may be incorporated into the rubber composition in order to promote the adhesion effect of the composition.

The present invention is illustrated by the following Examples, but is not limited thereto. In Examples, "part" and "%" are shown by weight, unless specified otherwise.

EXAMPLE 1

Into a four-necked flask provided with a reflux condenser and a thermometer are charged p-cresol (378 g), toluene (378 g) and 88% paraform (112 g). The mixture is heated to 60° C., and thereto is added dropwise a 10 N-NaOH aqueous solution (23.3 g) over a period of one hour at the same temperature. After the addition of the NaOH aqueous solution, the mixture is further heated to reflux temperature for 5 hours to give a solution of a resol type pre-polycondensate in toluene (891 g).

The toluene solution thus obtained contains solid components of 52% and the resol type pre-polycondensate has mol number of methylol group of 0.19 per 100 parts of the pre-polycondensate.

Subsequently, the reflux condenser on the flask is substituted by a cooling separator, and then, to the above reaction mixture are added resorcinol (192.5 g) and oxalic acid (11.0 g) at 60° C. After dissolving completely, the temperature of the mixture is raised, and the produced water-toluene azeotrope is led to the cooling separator. The toluene separated is circulated to the flask and water separated is removed out of the reaction system, by which water is completely distilled off. After distilling off water, toluene is further distilled off, and finally, the reaction mixture is heated to 150° C. under reduced pressure (reduced degree: 30 mmHg or less) to give Resin A having a softening point of 104° C. (630 g).

EXAMPLE 2

In the same manner as described in Example 1, a solution of a resol type pre-polycondensate in toluene (801 g) is prepared by using p-cresol (324 g), toluene (324 g), 88% paraform (133 g) and a 10 N-NaOH aqueous solution (20.0 g), wherein the mixture is kept at 60° C. during the addition of NaOH aqueous solution, and after the addition of NaOH aqueous solution, the mixture is kept at the reflux temperature for 2 hours.

The toluene solution contains solid components of 54% and the resol type pre-polycondensate has a mol number of methylol group of 0.74 per 100 parts of the pre-polycondensate.

Subsequently, the resol type pre-polycondensate is reacted with resorcinol (330 g) and oxalic acid (9.46 g) to give Resin B having a softening point of 115° C. (724 g).

EXAMPLE 3

In the same manner as described in Example 1, a solution of a resol type pre-polycondensate in toluene (663 g) is prepared by using p-cresol (216 g), toluene (300 g), 88% paraform (134 g) and a 10 N-NaOH aqueous solution (13.3 g), wherein the mixture is kept at 60° C. during the addition of NaOH aqueous solution, and after the addition of NaOH aqueous solution, the mixture is kept at the reflux temperature for 1 hour.

The toluene solution contains solid components of 51% and the resol type pre-polycondensate has a mol number of methylol group of 1.12 per 100 parts of the pre-polycondensate.

Subsequently, the resol type pre-polyconensate is reacted with resorcinol in the same manner as in Example 1 by using resorcinol (447 g) and oxalic acid (6.31 g) to give Resin C having a softening point of 117° C. (725 g).

EXAMPLE 4

In the same manner as described in Example 1, a solution of a resol type pre-polycondensate in toluene (878 g) is prepared by using p-cresol (130 g), p-tert-octylphenol (248 g), toluene (377 g), 88% paraform (107 g) and a 10 N-NaOH aqueous solution (16.0 g), wherein the mixture is kept at 60° C. during the addition of NaOH aqueous solution, and after the addition of NaOH aqueous solution, the mixture is kept at the reflux temperature for 2 hours.

The toluene solution contains solid components of 52% and the resol type pre-polycondensate has a mol number of methylol group of 0.66 per 100 parts of the pre-polycondensate.

Subsequently, the resol type pre-polycondensate is reacted with resorcinol in the same manner as in Example 1 by using resorcinol (264 g) and oxalic acid (7.57 g) to give Resin D having a softening point of 103° C. (675 g).

EXAMPLE 5

In the same manner as described in Example 1, a solution of a resol type pre-polycondensate in toluene (789 g) is prepared by using p-tert-octylphenol (351 g), toluene (351 g), 88% paraform (75.4 g) and a 10 N-NaOH aqueous solution (11.3 g), wherein the mixture is kept at 60° C. during the addition of NaOH aqueous solution, and after the addition of NaOH aqueous solution, the mixture is kept at the reflux temperature for 2 hours.

The toluene solution contains solid components of 52% and the resol type pre-polycondensate has a mol number of methylol group of 0.40 per 100 parts of the pre-polycondensate.

The resol type pre-polycondensate is reacted with resorcinol in the same manner as in Example 1 by using resorcinol (187 g) and oxalic acid (5.36 g) to give Resin E having a softening point of 115° C. (576 g).

EXAMPLE 6

In the same four-necked flask are charged phenol (329 g), benzene (329 g), and 88% paraform (134 g). After adding dropwise a 5 N-NaOH aqueous solution (20.8 g) to the mixture at 60° C. over a period of 1 hour, the mixture is kept at 80° C. for 2 hours to give a solution of a resol type pre-polycondensate in benzene (813 g).

The benzene solution thus obtained contains solid components of 54% and the resol type co-polycondensate has a mol number of methylol group of 0.30 per 100 parts of the pre-polycondensate.

Subsequently, the resol type pre-polycondensate is reacted with resorcinol in the same manner as in Example 1 by using resorcinol (190 g) and p-toluene-sulfonic acid (14.2 g) to give Resin F having a softening point of 98° C. (592 g).

EXAMPLE 7

Into the same four-necked flask as used in Example 1 are charged p-phenylphenol (418 g), xylene (418 g) and 88 % paraform (92.5 g). After adding dropwise a 10 N-NaOH aqueous solution (12.6 g) to the mixture at 60° C. over a period of 1 hour, the mixture is kept at the reflux temperature for 4 hours to give a solution of a resol type pre-polycondensate in xylene (941 g).

The xylene solution contains solid components of 53% and the resol type pre-polycondensate has a mol number of methylol group of 0.20 per 100 parts of the pre-polycondensate.

The resol type pre-polycondensate is reacted with resorcinol in the same manner as in Example 1 by using resorcinol (102 g) and oxalic acid (5.99 g) to give Resin G having a softening point of 94° C. (559 g).

EXAMPLE 8

In the same manner as described in Example 1, a solution of a resol type pre-polycondensate in toluene (767 g) is prepared by using p-(α-methylbenzyl)phenol (337 g), toluene (337 g), 88% paraform (81.2 g) and a 10 N-NaOH aqueous solution (11.3 g), wherein the mixture is kept at 60° C. during the addition of the NaOH aqueous solution, and after the addition of the NaOH aqueous solution, the mixture is kept at the reflux temperature for 4 hours.

The toluene solution contains solid components of 52% and the resol type pre-polycondensate has a mol number of methylol group of 0.54 per 100 parts of the pre-polycondensate.

Subsequently, the resol type pre-polycondensate is reacted with resorcinol in the same manner as in Example 1 by using resorcinol (187 g) and oxalic acid (5.36 g) to give Resin H having a softening point of 103° C. (561 g).

EXAMPLE 9

Into the same four-necked flask as used in Example 1 are charged 3,5-xylenol (366 g), methyl isobutyl ketone (366 g) and 88% paraform (102 g). After adding dropwise a 5-N NaOH aqueous solution (23.1 g) to the mixture at 50° C. over a period of 1 hour, the mixture is kept at 70° C. for 3 hours to give a solution of a resol pre-polycondensate in methyl isobutyl ketone (857 g).

The methyl isobutyl ketone solution thus prepared contains solid components of 53% and the resol type pre-polycondensate has a mol number of methylol group of 0.44 per 100 parts of the pre-polycondensate.

Subsequently, the resol type pre-polycondensate is reacted with resorcinol in the same manner as in Example 1 by using resorcinol (220 g) and oxalic acid (5.7 g) to give Resin I having a softening point of 112° C. (628 g).

REFERENCE EXAMPLE 1

To the solution of a resol type pre-polycondensate in toluene (891 g) as prepared in Example 1 are added resorcinol (115 g) and oxalic acid (11.0 g) at 60° C. After dissolving completely, the mixture is heated to the reflux temperature and is reacted for 6 hours. After the reaction, water and toluene are distilled off, and finally, the temperature of the mixture is raised to 150° C. under reduced pressure (reduced degree: 30 mmHg or less) to give Resin J having a softening point of 137° C. (561 g).

REFERENCE EXAMPLE 2

In the same manner as described in Example 1, excepting that the reaction time of p-cresol and formaldehyde at the reflux temperture is shortened to 1 hour, a solution of a resol type pre-polycondensate in toluene (891 g) is prepared.

The toluene solution thus prepared contains solid components of 54% and the resol type pre-polycondensate has a mol number of methylol group of 0.42 per 100 parts of the pre-polycondensate.

Subsequently, the resol type pre-polycondensate is reacted with resorcinol in the same manner as in Example 1 to give Resin K having a softening point of 141° C. (553 g).

REFERENCE EXAMPLE 3

To the solution of a resol type pre-polycondensate in toluene (801 g) as prepared in Example 2 are added resorcinol (330 g) and oxalic acid (9.46 g) at 60° C. After dissolving completely, the mixture is heated to the reflux temperature and is reacted for 6 hours. After the reaction, water and toluene are distilled off in the same manner as in Reference Example 1 to give Resin L having a softening point of 145° C. (727 g).

REFERENCE EXAMPLE 4

Into a one liter four-necked flask are charged resorcinol (496 g) and water (248 g), and the mixture is heated to 70° C. With keeping at 70° C., to the mixture is added dropwise a 37% formaldehyde aqueous solution (208 g) over a period of 1 hour. After the addition, the mixture is kept at 70° C. for 4 hours. After the reaction, the temperature of the reaction mixture is raised. When the temperature is raised to 100° C., the distillation of water begins, and when the temperature is over 130° C., the pressure in the flask is gradually reduced, and finally, the temperature of the reaction mixture is raised to 140° C. or higher under reduced pressure (reduced degree: 30 mmHg or less) to give Resin M having a softening point of 100° C. (416 g).

TEST 1

The adhesion effect of the resins prepared in Examples 1 to 9 and Reference Examples 1 to 4 was tested in the adhesion between natural rubber and untreated nylon cord or between natural rubber and a brass plated steel cord as follows:

Into a Banbury mixer was charged natural rubber (100 g) and the rubber was pre-mixed for 1 minute, and thereto were added carbon black (HAF black, 45.0 g), a softening agent (3.0 g), an antioxidant (ANTIGENE RD, a trade mark of Sumitomo Chemical Company, Ltd., 1.5 g) stearic acid (2.0 g), sulfur (2.0 g) and zinc oxide (5.0 g). The mixture was compounded for 2 minutes. To the compounded mixture were further added the resin to be tested (each 2.0 g), a vulcanization accelerator (SOXINOL CZ, a trade mark of Sumitomo Chemical Company, Ltd., 0.7 g) and a formaldehyde-donor (pentamethylolmelamine trimethyl ether, 2.4 g), and the mixture was further compounded for 1.5 minute and then was damped.

The rubber compositions thus prepared were each formed into sheets of required thickness between 10 inch rolls and tested on the adhesion of the rubber to an untreated nylon cord (1260 d/2) in accordance with H test as disclosed in Indian Rubber World, Vol. 114, March, pages 213-219 (1946). Besides the adhesion of the rubber to a brass plated steel cord (7×4×0.007") was also tested in accordance with the method as defined in ASTM D-2229. The results are shown in the following Table 1.

TABLE 1

| | Adhesion properties | |
|---|---|---|
| Resins | Adhesive force of rubber to untreated nylon cord (kg/9 mm) | Adhesive force of rubber to brass plated steel cord (kg) |
| This invention | | |
| Resin A | 9.5 | 90.5* |
| Resin B | 11.4 | 92.4* |
| Resin C | 12.7 | 94.1* |
| Resin D | 12.0 | 95.3* |
| Resin E | 11.3 | 90.7* |
| Resin F | 10.1 | 92.1* |
| Resin G | 10.0 | 92.2* |
| Resin H | 11.8 | 90.1* |
| Resin I | 11.4 | 93.6* |
| Reference | | |
| Resin J | 3.1 | 62.3 |
| Resin K | 6.1 | 60.4 |
| Resin L | 8.4 | 69.1 |
| Resin M | 10.8 | 75.0 |

[Note]:
*This means that the rubber was fractured, and hence, the true adhesive force is larger than the value mentioned in the above table.

TEST 2

The deliquescence resistance and the blocking resistance of the resins prepared in Examples 1 to 9 and Reference Examples 1 to 4 were tested as follows:

The resins to be tested were pulverized into 200 mesh size, and the pulverized resins (each about 0.3 g) were almost uniformly spread on a dish, which was allowed to stand in a constant moisture and temperature vessel at 40° C. under a relative humidity of 65%, and whereby the amount of absorbed moisture and the change of blocking were observed for about one month. The amount of absorbed moisture was measured by Karl Fischer's method and is shown by % of the moisture. The results are shown in Table 2. As is clear from the test results, the resins prepared by the present invention showed less amount of absorbed moisture and more excellent storage stability in comparison with resorcinol resin.

TABLE 2

| | Amount of absorbed moisture (%) (State of blocking) | | | | |
|---|---|---|---|---|---|
| Resins | Observed on 1st day | 7th day | 14th day | 21st day | 28th day |
| Resin A | 0.4 | 0.6 | 0.8 | 1.0 | 1.1 |
| | (no change) | (no change) | (no change) | (no change) | (no change) |
| Resin B | 0.5 | 0.8 | 1.0 | 1.1 | 1.3 |
| | (no change) | (no change) | (no change) | (no change) | (no change) |
| Resin C | 0.7 | 1.0 | 1.4 | 1.7 | 2.4 |
| | (no change) | (no change) | (no change) | (a little sticky) | (a little sticky) |
| Resin D | 0.5 | 0.7 | 0.9 | 1.2 | 1.4 |
| | (no change) | (no change) | (no change) | (no change) | (no change) |
| Resin E | 0.5 | 0.7 | 0.8 | 0.8 | 1.0 |
| | (no change) | (no change) | (no change) | (no change) | (no change) |
| Resin F | 0.6 | 0.8 | 0.9 | 1.1 | 1.1 |

TABLE 2-continued

| | Amount of absorbed moisture (%) (State of blocking) | | | | |
|---|---|---|---|---|---|
| Resins | Observed on 1st day | 7th day | 14th day | 21st day | 28th day |
| Resin G | (no change) 0.4 | (no change) 0.5 | (no change) 0.8 | (no change) 0.8 | (no change) 0.9 |
| Resin H | (no change) 0.4 | (no change) 0.6 | (no change) 0.9 | (no change) 1.0 | (no change) 1.0 |
| Resin I | (no change) 0.6 | (no change) 0.8 | (no change) 1.0 | (no change) 1.2 | (no change) 1.2 |
| Resin M | (no change) 3.4 (blocking, sticky) | (no change) 7.4 (blocking, sticky) | (no change) 10.4 (blocking, sticky) | (no change) 11.5 (blocking, sticky) | (no change) 11.8 (blocking, sticky) |

EXAMPLE 10

Into a four-necked flask provided with a reflux condenser and a thermometer are charged p-cresol (324 g, 3.19 mol), toluene (324 g), 88% paraform (133 g, 3.9 mol) and a 10 N-NaOH aqueous solution (15 ml). The mixture is reacted at the reflux temperature for 2 hours to give a solution of a pre-polycondensate of p-cresol in toluene (801 g).

Subsequently, the reflux condenser on the flask is substituted with a separator, and then the temperature of the mixture is adjusted to 60° C. and thereto are added resorcinol (220 g, 2.0 mol) and oxalic acid (11 g). After dissolving completely, the temperature of the mixture is raised, and thereby, the pre-polycondensate of p-cresol is reacted with resorcinol for 4 hours, during which the produced water-toluene azeotrope is led to the separator. The toluene separated is circulated to the flask and water separated is removed out of the reaction system. After completion of the reaction, toluene is distilled off, and finally, the mixture is concentrated at 150° C. under reduced pressure (reduced degree: 30 mmHg or less) to give a resorcinol/p-cresol/co-polycondensate resin (Resin O) having a softening point of 104° C.

EXAMPLE 11 to 16

In the same manner as described in Example 10, excepting that the components are varied as shown in the following Table 3, various co-polycondensate resins (Resin P to U) are prepared.

TABLE 3

| Resins | Compounds of the formula (a) g (mol) | Aldehydes g (mol) | Compounds of the formula (b) g (mol) |
|---|---|---|---|
| Resin P | p-tert-Octylphenol 20.6 (0.1) p-Cresol 43.2 (0.4) | Paraform*[1] 22.2 (0.65) | Resorcinol 55 (0.5) |
| Resin Q | 3-Methyl-5-isopropylphenol 30 (0.2) 3,5-xylenol 61 (0.5) | Paraform*[1] 22.2 (0.65) | Acetylresorcinol 45.6 (0.3) |
| Resin R | p-(α-Methylbenzyl)-phenol 119.4 (0.6) | Acetaldehyde*[2] 39.1 (0.8) | m-Aminophenol 43.6 (0.4) |
| Resin S | p-Phenylphenol 42.5 (0.25) | Paraform*[1] 23.6 (0.7) | Resorcinol 82.5 (0.75) |
| Resin T | Phenol 18.8 (0.2) m-Isopropylphenol 27.2 (0.2) | Paraform*[1] 20.5 (0.6) | Resorcinol monoethyl ether 77.4 (0.6) |
| Resin U | p-sec-Butylphenol 37.5 (0.25) p-Cresol 54 (0.5) | Acetaldehyde*[2] 39.1 (0.8) | Resorcinol 27.5 (0.25) |

[Note]:
*[1]The paraform has a purity of 88%.
*[2]The acetaldehyde has a purity of 90%.

REFERENCE EXAMPLE 5

Preparation of xylenol/p-tert-octylphenol/formaldehyde co-polycondensate resin

Into a four-necked flask provided with a reflux condenser and a thermometer are charged p-tert-octylphenol (133.9 g, 0.65 mol), toluene (206 g), 88% paraform (23.6 g, 0.7 mol) and a 10 N-NaOH aqueous solution (8 ml). The mixture is reacted at 70° C. for 3 hours, and thereto is added 3,5-xylenol (42.7 g, 0.35 mol). The mixture is further reacted for 3 hours. After the reaction, water and toluene are simultaneously distilled off at 150° C. under reduced pressure (reduced degree: 30 mmHg or less) to give a solid xylenol/p-tert-octylphenol/formaldehyde co-polycondensate resin (Resin V).

REFERENCE EXAMPLE 6

Preparation of a co-polycondensate resin by the process as described in Example 1 of U.S. Pat. No. 3,963,652.

Into a 300 ml flask are charged pure methacresol (32.4 g, 0.3 mol), 37% formalin (48.6 g, 0.6 mol) and a 10 N-NaOH aqueous solution (3 ml, 0.03 mol), and the mixture is reacted at 70° C. for 3 hours. To the mixture is further added resorcinol (77 g, 0.7 mol), and the mixture is further reacted at 50° C. for 3 hours. After completion of the reaction, water is distilled off at 120° C. under reduced pressure (reduced degree: 15 mmHg) to give cresol/resorcinol/formaldehyde co-polycondensate resin having a softening point of 92° C. (Resin W).

REFERENCE EXAMPLE 7

Preparation of resorcinol/formaldehyde resin

Into a 500 ml flask are charged resorcinol (110 g, 1.0 mol) and 37% formalin (44.5 g), and the mixture is reacted at 70° C. for 5 hours. After the reaction, water is distilled off at 150° C. under reduced pressure (inner pressure: 25 mmHg) to give a resorcinol/formaldehyde resin having a softening point of 98° C. (Resin X).

EXAMPLE 17

Various rubber compositions are prepared by the following process using a Banbury mixer (the casing temperature of the Banbury mixer is 120°-130° C).

A natural rubber (100 parts) is charged into the mixer and is pre-mixed for 1 minute, and thereto are added HAF black (45 parts), a softening agent (3 parts), an antioxidant (ANTIGENE RD, a trademark of Sumitomo Chemical Company, Ltd., 1.5 parts), sulfur (2 parts), stearic acid (2 parts) and zinc oxide (5 parts), and the mixture is compounded for 2 minutes.

To the compounded mixture are added each one of the resins prepared in Examples 10 to 16 and Reference Examples 5 to 7 (Resins O to X, each 2 parts), a vulcanization accelerator (SOXINOL CZ, a trademark of Sumitomo Chemical Company, Ltd., 0.7 part) and a formaldehyde-donor (pentamethylolmelamine trimethyl ether, 2.4 parts), and the mixture is further compounded for 1.5 minutes and is then damped to give various rubber compositions.

The rubber compositions thus prepared were each formed into sheets of required thickness between 10 inch rolls and tested on the adhesion of the rubber to an untreated nylon cord (1260 d/2) in accordance with H test as disclosed in Indian Rubber World, Vol. 114, March, pages 213-219 (1946). Besides, the adhesion of the rubber to a brass plated steel cord (7×4×0.007") was also tested in accordance with the method as defined in ASTM D-2229. The vulcanization was carried out at 150° C. for 20 minutes. The results are shown in Table 4.

TABLE 4

| | Adhesion properties | |
|---|---|---|
| Resins | Adhesive force of rubber to untreated nylon cord (kg/9 mm) | Adhesive force of rubber to brass plated steel cord (kg) |
| This invention | | |
| Resin O | 11.2 | 85.5* |
| Resin P | 12.5 | 92.3* |
| Resin Q | 10.9 | 80.4 |
| Resin R | 11.5 | 92.1* |
| Resin S | 13.8 | 91.8* |
| Resin T | 13.0 | 90.0* |
| Resin U | 10.9 | 83.8 |
| Reference | | |
| Resin V | 3.1 | 61.2 |
| Resin W | 10.8 | 74.3 |
| Resin X | 10.6 | 69.8 |

[Note]:
*This means that the rubber was fractured, and hence, the true adhesive force is larger than the value mentioned in the above table.

EXAMPLE 18

In the same manner as described in Example 17, excepting that the following ingredients are used, various rubber compositions are prepared.

| Components of the rubber compositions | |
|---|---|
| SBR# 1500 | 100.0 parts |
| Stearic acid | 2.0 parts |
| Silica | 10.0 parts |
| HAF Black | 50.0 parts |
| A softening agent (aromatic) | 6.0 parts |
| Zinc oxide | 5.0 parts |
| ANTIGENE RD | 1.5 parts |
| Sulfur | 3.0 parts |
| SOXINOL NS*1 | 1.2 parts |
| Hexamethylenetetramine*2 | 1.0 parts |

| Components of the rubber compositions | |
|---|---|
| Resin | 2.0 parts |

[Note]:
*1 A vulcanization accelerator, a trademark of Sumitomo Chemical Company, Ltd.
*2 A formaldehyde-donor The rubber compositions thus prepared were tested on the adhesion properties in the same manner as described in Example 17. The results are shown in Table 5.

TABLE 5

| | Adhesion properties | |
|---|---|---|
| Resins | Adhesive force of rubber to untreated nylon cord (kg/9 mm) | Adhesive force of rubber to brass plated steel cord (kg) |
| This invention | | |
| Resin O | 11.5 | 86.4* |
| Resin P | 13.0 | 89.3* |
| Resin Q | 11.5 | 85.3* |
| Resin R | 12.0 | 88.8* |
| Resin S | 14.0 | 90.0* |
| Resin T | 13.5 | 85.6* |
| Resin U | 11.5 | 87.4* |
| Reference | | |
| Resin V | 3.2 | 72.4 |
| Resin W | 11.8 | 78.5 |
| Resin X | 11.5 | 64.3 |

[Note]:
*This means that the rubber was fractured, and hence, the true adhesive force is larger than the value mentioned in the above table.

EXAMPLE 19

To the base rubber composition as shown below were incorporated the first component and the second component as shown in Table 9 (each 2 PHR), and the resulting rubber compositions were tested on the adhesion between rubber and brass plated steel cord According to ASTM D-2229. The adhesiveness was evaluated by the adhesion force at 24 hours after adhering with vulcanization (initial bond strength) and the adhesion force after it was vulcanized and thereafter aged in a Geer oven at 100° C. for 48 hours (thermoresistant bond strength).

| Base rubber composition | |
|---|---|
| Natural rubber | 100.0 PHR |
| Stearic acid | 3.0 PHR |
| Zinc oxide | 5.0 PHR |
| HAF Black | 45.0 PHR |
| A softening agent | 3.0 PHR |
| Sulfur | 3.5 PHR |
| SOXINOL NS | 0.7 PHR |
| ANTIGENE RD | 1.5 PHR |

TABLE 9

| | The first component | The second component | Adhesiveness (kg) | |
|---|---|---|---|---|
| | | | Initial bond strength | Thermo-resistant bond strength |
| | Resin A | Compound B | 91.8 | 82.3 |
| | Resin P | " | 93.4 | 80.1 |
| | Resin Q | " | 92.8 | 82.1 |
| The present | Resin S | " | 91.5 | 81.8 |
| invention | Resin U | " | 90.8 | 84.3 |
| | Resin A | Compound D | 90.2 | 80.0 |
| | Resin P | " | 89.6 | 79.8 |
| | Resin Q | " | 90.0 | 80.1 |
| | Resin S | " | 91.2 | 89.5 |

TABLE 9-continued

|  | The first component | The second component | Adhesiveness (kg) | |
|---|---|---|---|---|
|  |  |  | Initial bond strength | Thermo-resistant bond strength |
|  | Resin U | " | 89.5 | 80.0 |
| Reference | Resin X | Compound B | 75.3 | 69.5 |
| Examples | Resin X | Compound D | 74.2 | 68.2 |

EXAMPLE 20

To the base rubber composition as shown below were incorporated the first component and the second component as shown in Table 10 (each 2 PHR), and the resulting rubber compositions were tested on the adhesion between rubber and brass plated steel cord in the same manner as in

EXAMPLE 19

The results are shown in Table 10.

| Base rubber composition | |
|---|---|
| SBR# 1500 | 100.0 PHR |
| Stearic acid | 2.0 PHR |
| HAF Black | 50.0 PHR |
| A softening agent (aromatic) | 9.0 PHR |
| Sulfur | 3.0 PHR |
| Zinc oxide | 5.0 PHR |
| ANTIGENE RD | 1.2 PHR |
| SOXINOL NS | 1.5 PHR |

TABLE 10

|  | The first component | The second component | Adhesiveness (kg) | |
|---|---|---|---|---|
|  |  |  | Initial bond strength | Thermo-resistant bond strength |
|  | Resin P | Compound B | 93.4 | 80.1 |
|  | Resin Q | " | 92.8 | 82.1 |
|  | Resin S | " | 91.5 | 81.8 |
| The present | Resin U | " | 90.8 | 84.3 |
| invention | Resin P | Compound D | 89.6 | 79.8 |
|  | Resin Q | " | 90.0 | 80.1 |
|  | Resin S | " | 91.2 | 89.5 |
|  | Resin U | " | 89.5 | 80.0 |
| Reference | Resin X | Compound B | 75.3 | 69.5 |
| Examples | Resin X | Compound D | 74.2 | 68.2 |

The invention being thus described it will be obvious that the same way may be varied in many ways. Such variations are not to be regarded as a departure from the spirit and scope of the invention, and all such modifications, as would be obvious to one skilled in the art, are intended to be included within the scope of the following claims.

What is claimed is:

1. A vulcanizable rubber composition comprising (I) a rubber component selected from at least one member of the group consisting of natural rubber, styrene-butadiene copolymer rubber, polyisoprene rubber, polybutadiene rubber, acrylonitrilebutadiene rubber and polychloroprene rubber, (II) a compound which is capable of generating formaldehyde by heating, and (III) a co-polycondensate resin prepared by condensing (A) a resol type pre-polycondensate prepared by reacting at least one of a monovalent phenol of the formula (a):

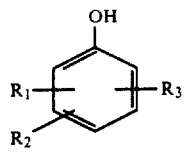

wherein $R_1$, $R_2$ and $R_3$ are the same different and are each hydrogen, an alkyl having 1 to 12 carbon atoms, and aryl having 6 to 12 carbon atoms or an aralkyl having 7 to 12 carbon atoms, and formaldehyde or acetaldehyde in the presence of an alkaline catalyst, and (B) at least one of the compounds of the formula (b):

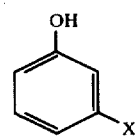

wherein X is —OH, —NH$_2$, —O—CO—R$_4$ or —O—R$_5$, and R$_4$ and R$_5$ are each an alkyl having 1 to 4 carbon atoms, said compounds of the formula (a) and the formula (b) being used in a molar ratio of 0.75/0.25 to 0.25/0.75, while distilling off water present in the reaction system, and then solidifying the reaction mixture, said component (II) being added in an amount of 0.3 to 10 parts by weight per 100 parts by weight of component (I) and said component (III) being added in an amount of 0.5 to 10 parts by weight per 100 parts by weight of component (I).

2. In a method for bringing about the adhesion between rubber and reinforcing materials by applying a vulcanizable rubber composition comprising natural or synthetic rubber to a pretreated or untreated reinforcing material and vulcanizing the rubber composition, the improvement which comprises using a vulcanizable rubber composition comprising (I) a rubber component selected from at least one member of the group consisting of natural rubber, styrene-butadiene copolymer rubber, polyisoprene rubber, polybutadiene rubber, acrylonitrile butadiene rubber and polychloroprene rubber, (II) a compound which is capable of generating formaldehyde by heating, and (III) a co-polycondensate resin prepared by condensing, (A) a resol type pre-polycondensate prepared by reacting at least one of monovalent phenols of the formula (a):

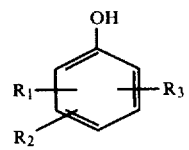

wherein $R_1$, $R_2$ and $R_3$ are the same or different and are each hydrogen, an alkyl having 1 to 12 carbon atoms, an aryl having 6 to 12 carbon atoms or an aralkyl having 7 to 12 carbon atoms, and formaldehyde or acetaldehyde in the presence of an alkaline catalyst, and (B) at least one of the compounds of the formula (b):

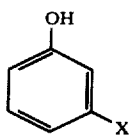

wherein X is —OH, —NH₂, —O—CO—R₄ or —O—R₅, and R₄ and R₅ are each an alkyl having 1 to 4 carbon atoms, said compounds of the formula (a) and the formula (b) being used in a molar ratio of 0.75/0.25 to 0.25/0.75, while distilling off water present in the reaction system, and then solidifying the reaction mixture, said component (II) being added in an amount of 0.3 to 10 parts by weight per 100 parts by weight of component (I) and said component (III) being added in an amount of 0.5 to 10 parts by weight per 100 parts by weight of component (I).

3. The composition according to claim 1, wherein the co-polycondensate resin is a solid co-polycondensate resin prepared by reacting at least one of phenols of the formula (a) with formaldehyde in an amount of 0.5 to 2.5 equivalents per one equivalent of the phenols in the presence of an alkaline catalyst to give a resol type pre-polycondensate which contains substantially no unreacted formaldehyde, and then condensing the pre-polycondensate thus obtained with resorcinol or m-aminophenol in an amount of 0.43 to 2.3 equivalents per one equivalent of the phenols and of 0.7 to 1.5 equivalent per one equivalent of methylol group included in the pre-polycondensate, while distilling off water present in the reaction system.

* * * * *